(12) United States Patent
Trong et al.

(10) Patent No.: US 6,681,313 B1
(45) Date of Patent: Jan. 20, 2004

(54) METHOD AND SYSTEM FOR FAST ACCESS TO A TRANSLATION LOOKASIDE BUFFER

(75) Inventors: Son Dao Trong, Stuttgart (DE); Luis Parga Cacheiro, Backnang (DE); Rolf Sautter, Bondorf (DE); Hans-Werner Tast, Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/566,319

(22) Filed: May 8, 2000

(30) Foreign Application Priority Data

Jun. 23, 1999 (EP) .............................................. 99112075

(51) Int. Cl.$^7$ ............................................... G06F 12/08
(52) U.S. Cl. ........................ 711/207; 711/205; 711/219; 711/220
(58) Field of Search ................................. 711/219, 220, 711/205, 206, 207

(56) References Cited

U.S. PATENT DOCUMENTS 5,754,819 A * 5/1998 Lynch et al. ................. 711/218

* cited by examiner

*Primary Examiner*—Mano Padmanabhan
*Assistant Examiner*—Midys Inoa
(74) *Attorney, Agent, or Firm*—Scully, Scott, Murphy & Presser; Richard M. Ludwin, Esq.

(57) ABSTRACT

In a system for conducting virtual address translation in a virtual memory system and implementing a table such as a Translation Lookaside Buffer, a system and method enabling quicker access to tables entries in which the entries are addressed after adding a plurality of address parts wherein the plurality is two (2) or (3). Particularly, a smaller and/or faster adder is used having, for example, only n=2 ports in the time critical path. In order to make the exact address calculation, during array accesses, a multiplexor is implemented to decide, after the TLB arrays are accessed for preselection, which of a plurality of possible entries has to be taken.

10 Claims, 5 Drawing Sheets

FIG. 5

| Sum | Result with Carry | | |
|---|---|---|---|
| | 0 | 1 | 2 |
| 0 | 0 | 1 | 2 |
| 1 | 1 | 2 | 3 |
| 2 | 2 | 3 | 4 |
| 3 | 3 | 4 | 5 |
| 125 | 125 | 126 | 127 |
| 126 | 126 | 127 | 0 |
| 127 | 127 | 0 | 1 |

FIG. 6

Block

| 1 | 2 | 3 | 4 | |
|---|---|---|---|---|
| 0 | 1 | 2 | 3 | Result = 0 |
| 4 | 5 | 6 | 7 | |
| : | : | : | : | |
| 124 | 125 | 126 | 127 | |

FIG. 7

Block

| 1 | 2 | 3 | 4 | |
|---|---|---|---|---|
| 0 | 1 | 2 | 3 | Result = 1 |
| 4 | 5 | 6 | 7 | |
| : | : | : | : | |
| 124 | 125 | 126 | 127 | |

Block

| 1 | 2 | 3 | 4 |
|---|---|---|---|
| 0 | 1 | 2 | 3 |
| 4 | 5 | 6 | 7 |
| : | : | : | : |
| 124 | 125 | 126 | 127 |

Result = 2

FIG. 8

Block

| 1 | 2 | 3 | 4 |
|---|---|---|---|
| 0 | 1 | 2 | 3 |
| 4 | 5 | 6 | 7 |
| : | : | : | : |
| 124 | 125 | 126 | 127 |

Result = 126

FIG. 9

| Inexact Address | | Word Line | |
|---|---|---|---|
| | | Block 1, 2 | Block 3, 4 |
| 0000000 | 0 | 0 | 0 |
| 0000001 | 1 | 0 | 0 |
| 0000010 | 2 | 1 | 0 |
| 0000011 | 3 | 1 | 0 |
| 0000100 | 4 | 1 | 1 |
| 0000101 | 5 | 1 | 1 |
| 0000110 | 6 | 2 | 1 |
| 0000111 | 7 | 2 | 1 |
| 0001000 | 8 | 2 | 2 |
| | | | |

FIG. 10

METHOD AND SYSTEM FOR FAST ACCESS TO A TRANSLATION LOOKASIDE BUFFER

BACKGROUND OF THE INVENTION

1. Technical Field

The present invention relates to address translation in modern computer processors. In particular, the present invention relates to an improved method and system.

2. Prior Art

The present invention has a very general scope as its basic idea can be used in any situation when a table structured memory should be accessed quickly, and the access requires an addition of a plurality of n bit sequences, n being greater than 1, and particular 2 or 3.

A particular field of application, however, is system address translation.

Thus, the inventional aspects are set into relation with prior art in this particular field in order to be able to enlighten clearly its advantages.

Virtual memory techniques including the provision of virtual code addresses are one of the basic concepts alleviating the job of application programmers in that they need not worry about the physical locations where code could be placed in memory when the program is loaded in order to be run.

A nearly unlimited virtual address space is provided thereby for the programmer's activities. In a process called 'address translation' such virtual addresses are transformed into physical addresses which uniquely define physical locations in the main memory at run-time.

In virtual memory, the address is broken into a virtual page address part which is the upper portion the address, and a page offset, also called byte index, the lower portion. When translated into physical memory quantities the virtual page address part is translated into a physical page address which constitutes the physical start address of the page. The page offset is not changed during translation. The number of bits in the page offset determines the page size.

The virtual page address part is broken in several parts, e.g., page index and segment index. Every part is translated through tables, e.g., page tables for the page index and segment tables for the segment index. These tables are so large that they must be stored in main memory. This means that every memory access takes at least twice as long: one memory access for every table access for the address translation and one memory access more to get the data.

The key for improving access performance is to rely on locality of reference to the page table: When a translation for a virtual page number is used, it will probably be needed again in the near future of a program run, because the references to the words on that page have both temporal and spatial locality. Accordingly, modern machines include a special cache that keeps track of recently used translations. This special address translation cache is further referred to as a translation-lookaside buffer (TLB).

Said translation process takes in general several cycles, therefore a cache array, called as well Translation Lookaside Buffer (TLB) or Translation Buffer (TB) is used, where an absolute address corresponding to a virtual address is saved after the translation process is made once.

A TLB entry is addressed by a part of the virtual address, in this example 64 bit wide virtual addresses are used for reference. The most significant bit is defined here as bit 0, the least significant bit is bit 63 (Big Endian). A prior art TLB has 128 entries, why 7 bits are needed to address the entries. For example, bits 45 to 51 are used to address the TLB. This is shown in FIG. 1.

Depending on the individual computer processor architecture the virtual address has to be generated from multiple parts to be added. In architectures used in IBM S/390 systems there are three parts called basis, index and displacement. The basis and the index are 64 bits wide, the displacement contains 12 bits. To determine the address of a TLB entry, often all 3 parts have to be added. Bits 45 to 51 of the sum are the TLB address, as shown in FIG. 1. To get the address of the TLB entry according to prior art the 19 least significant bits have to be added, because the sum of these bits include bits 45 to 51, the TLB entry address.

In prior art like IBM S/390 processor architecture a 3-port adder is used to add the basis, the index and the displacement. This has to be a 19 bit wide 3-port adder as m=3 address parts are added, because the bits needed to access the TLB are bits 45 to bit 51. These 7 bits are decoded by an address decoder to activate the corresponding word line and read the TLB entry. This is shown in FIG. 2.

The over all access time is the sum of the time needed by the 19 bit wide 3-port adder, the address decoder and the TLB access.

Said access time is quite long. Thus, it would be desirable to shorten it and to increase system performance with it.

Therefore, an object of the present invention is to provide an improved method and system for a quicker access to tables, i.e, table entries, e.g., a system table like a TLB in which the entries are addressed after adding some plurality of address parts where said plurality is 2, or 3 most commonly, but not forcedly.

SUMMARY OF THE INVENTION

The present invention is based on a first consideration to equilibrate system usage during said address translation processes and to avoid time portions where some kind of inactivity or only small activity prevails.

The second basic consideration is to avoid elements which are naturally slow in performance because of their particular way to operate. In this case, a relatively wide adder like a 19-bit 3-port adder operates quite slowly.

The key idea is to use a smaller and/or faster adder having e.g., only n=2 ports in the time critical path which leads to an ambiguous result, and to make the exact address calculation, which takes more time, during the array accesses, and to decide by a multiplexor after the TLB arrays were accessed for some kind of preselection, which of a plurality of e.g., three possible entries has to be taken.

Thus, the prior art approach is quitted which used to access a TLB after the lowest 19 bits of the virtual address have been added completely and the addition result is present. According to a preferred aspect of the present invention, when m<n, only a short 2-port 7-bit addition is performed for being able to access the TLB. As the 7 bits do not include the lowest significant bits the TLB access is first just a preselective access in that first trial. But there is not much time lost by the 2-port 7-bit addition compared to the prior art 3-port 19-bit addition. Thus the time critical path in that total TLB access is shortened, and the remaining rest of precise address selection is moved into the phases of decode and TLB access itself.

According to the present invention those aspects mentioned above are combined and a synergizing effect is achieved.

According to the present invention the prior art drawback of using only a 7-bit address for the TLB access while having to need a 19-bit adder is avoided.

According to the present invention it is possible to achieve a faster access if only some middle level bit portion as, e.g., bits $B_{45}$ to $B_{51}$ are added with bits $X_{45}$ to $X_{51}$. Another performance increase is achieved because in this case only a 2-port adder is needed instead of a 3 port adder.

By adding only bits $B_{45}$ to $B_{51}$ of the basis and bits $X_{45}$ to $X_{51}$ of the index the right address might not be gotten, the result gets ambiguous as there may be a carry from the sum bits 52 to 63. As in this case three numbers, i.e., basis, index and displacement have to be added the carry can be 0, 1 or 2. If, e.g., 7 numbers would have to be added the possible carry values would be 0, 1, 2, 3, 4, 5, and 6.

That means, the correct result can be the 7 bit address of the first addition if the carry is 0, or it can be the 7 bit address plus 1 or 2 in the case that the carry is 1 or 2, respectively. Some examples are shown in Table 1 depicted in FIG. 4.

If the sum of the 7 bit adder of bits $B_{45}$ to $B_{51}$ of the basis and bits $X_{45}$ to $X_{51}$ of the index is equal to 0 the possible result can be 0 (carry 0), 1 (carry 1) or 2 (carry 2). If the sum is equal to 1 the possible result can be 1 (carry 0), 2 (carry 1) of 3 (carry 2). If the sum is equal to 126 the possible complete result can be 126 (carry 0), 127 (carry 1) or 0 (carry 2), because the result is wrapped around the end of the number chain 0 , . . . , 127.

Because of the ambiguous result of the 7-bit addition the three entries corresponding to the three possible addresses have to be selected. This is done advantageously by splitting the TLB array into 4 smaller arrays, the first containing the entries 0, 4, 8, . . . , 124, the second containing the entries 1, 5, 9, . . . , 125, the third containing the entries 2, 6, 10, . . . , 126 and the fourth containing the entries 3 , 7, 11, . . . , 127. This is shown in FIGS. 5 to 8. Then, by way of a multiplexor the right preselection is selected.

The reason for splitting the TLB into p=4 parts instead of 3 parts is the binary system. This leads to the possibility to split the TLB with 128 entries into 4 parts with a equal number of entries.

In conjunction with that configuration of three potential carry values and four TLB sub-blocks it should be noted that only two simple word line decoders are required instead of normally four. One is for sub-blocks 1 and 2, the other one for blocks 3 and 4.

Another main advantage is that by using only two word lines per line for four blocks the area required on the chip can be reduced. This is because every word line may have to cross all the blocks, and the array cells are not big enough for four word lines crossing each cell, but they are big enough for two word lines.

According to a preferred embodiment of a circuit according to the present invention the 2-port adder is integrated in the macro device implementing the method described above. This yields to a further increase of performance.

According to a further aspect of the present invention the inventional concept is extendible to cases, where m=n. Thus, only one advantage—the fact that less bits have to be added before accessing the TLB—can be used instead of two advantages as a 3-port adder would be necessary instead of a 2port adder.

BRIEF DESCRIPTION OF THE DRAWINGS

Preferred embodiments of the present invention will now be described, by way of example only, with reference to the accompanying drawings in which:

Figure 1:
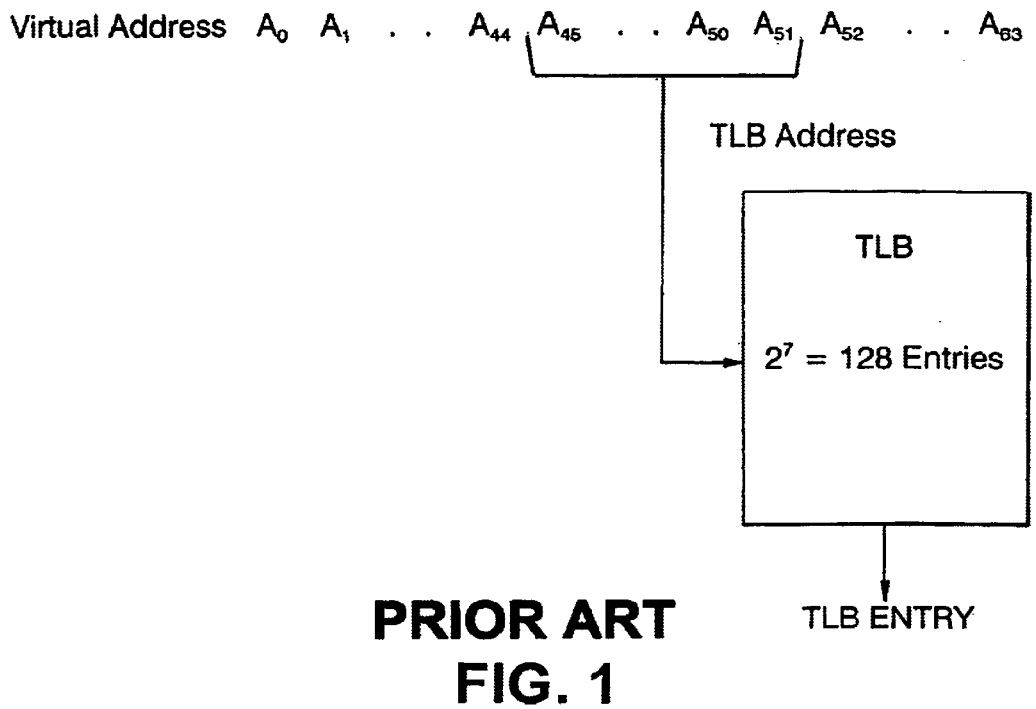
Figure 2:
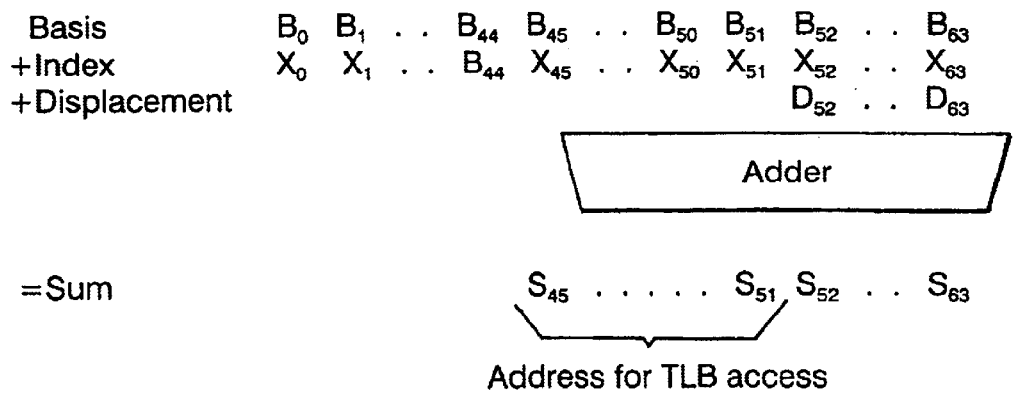
Figure 3:
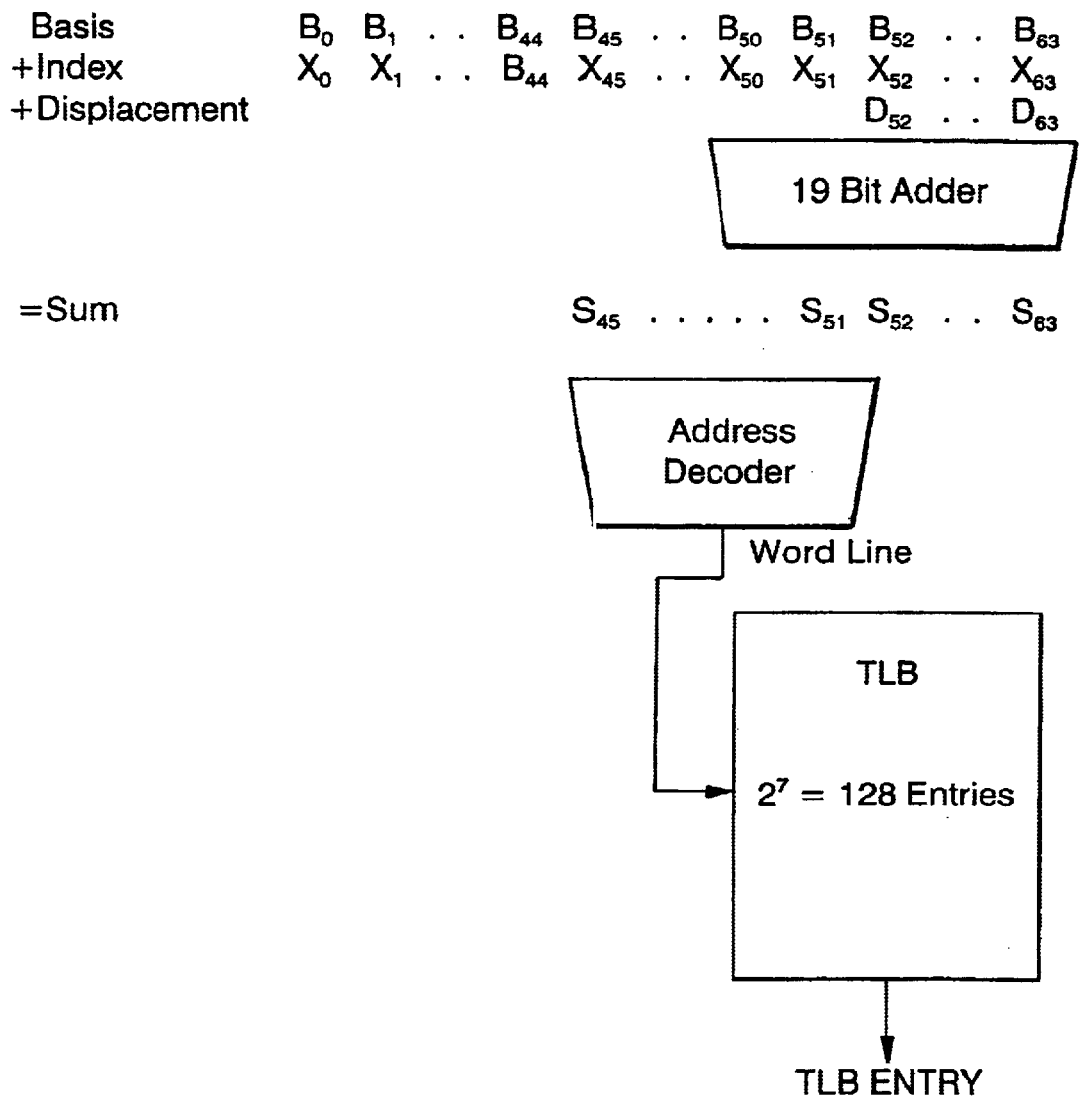
Figure 4:
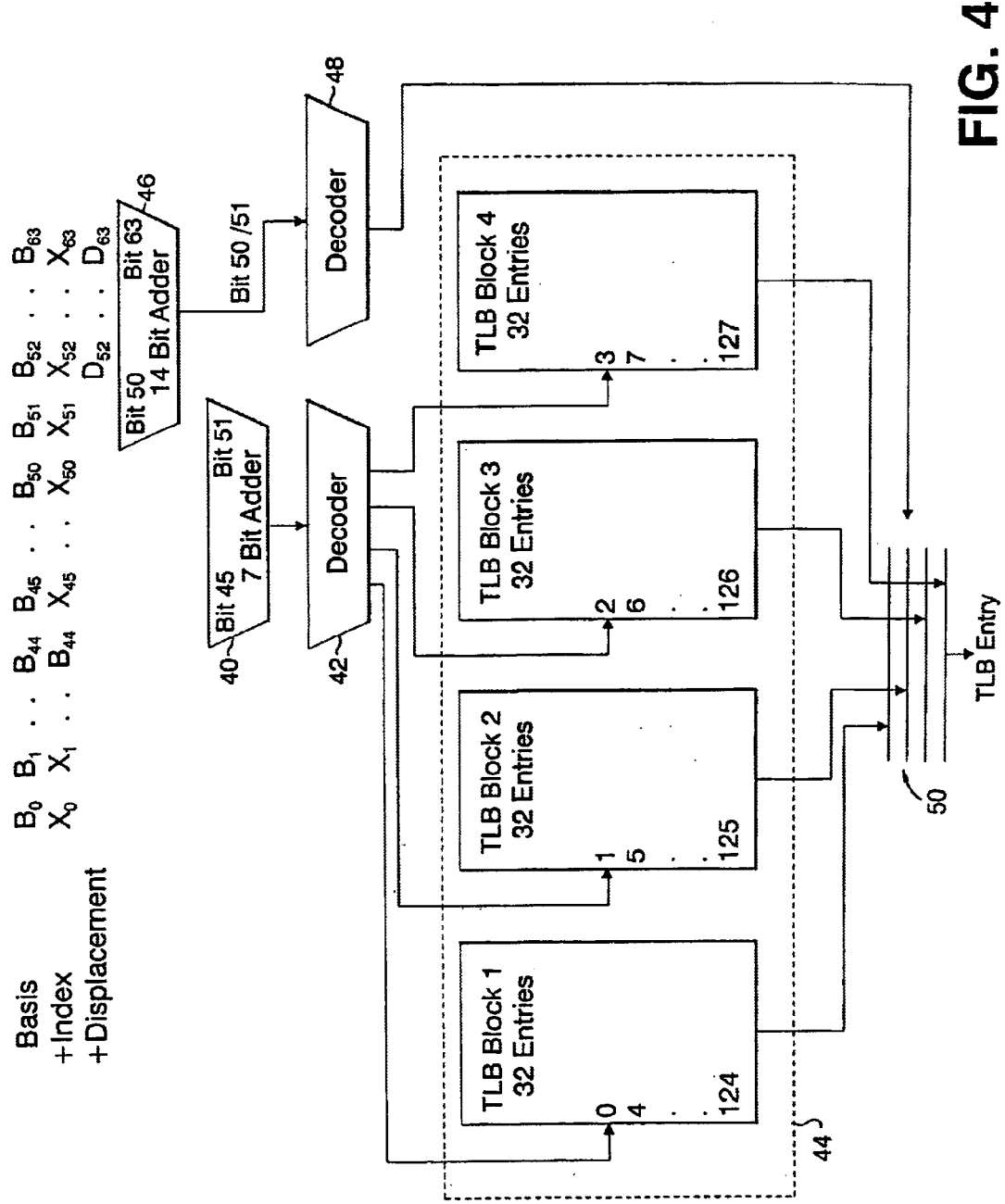

| | |
|---|---|
| FIG. 1 | is a schematic representation of a particular portion of a virtual address needed according to prior art methods to access a TLB, |
| FIG. 2 | is a schematic representation of prior art three-part address composition, |
| FIG. 3 | is a schematic sketch of prior art address generation and TLB access, |
| FIG. 4 | is a schematic representation of a preferred implementation according to a preferred inventional embodiment of the inventional method, |
| FIG. 5 | is a schematic representation reflecting the relationship between carry and sum according to the invention, |
| FIG. 6 to 9 | are each a schematic representation showing the dependence of the sum as the 7-bit addition result and different results dependent each on a particular Carry value. |
| FIG. 10 | is a table showing the mapping between a chosen inexact 7-bit address from the 7-bit adder and the word lines to be selected for proper line decoding of TLB sub-blocks in a configuration of 3 potential carrys and 4 TLB sub-blocks. |

DETAILED DESCRIPTION OF THE PREFERRED EMBODIMENTS OF THE INVENTION

With general reference to the Figures and with special reference now to FIG. 4 the basic structure of a preferred implementation of the inventional partial address Generation and TLB access is described with reference to Big Endian bit notation in which bit 0 is the highest level bit and bit 63 is the lowest level bit in an exemplary 64-bit address architecture.

Addresses are often to be added in 3-part form comprising basis denoted as B0, B1 , . . . B63, index X0, X1 , . . . X63, each 64 bit wide and displacement of e.g. 12 bits denoted as D52, D53 , . . . D63 as depicted in the upper part of the drawing.

In a first block of steps bits B45 , . . . B51 and bits X45 , . . . X51 are selected as a middle level bit range not comprising the respective remaining 12 lower level bits 52 , . . . 63.

Then, in a next step, these bit groups are added in a fast 7-bit 2-port adder 40 and the result is fed to a decoder 42 connected to the output of said 7-bit adder 40 as an intermediate result for decoding and accessing the post-connected TLB 44 which is depicted surrounded by a broken line. TLB 44 comprises four sub-blocks 1 to 4. Each of said sub-blocks is a small TLB array of only 32 array elements. Block 1 holds the entries for intermediate results 0, 4, 48 , . . . 124, block 2 holds the entries for 1, 5, 9 , . . . 125 etc., as depicted in the drawing. Dependent of the intermediate result fed by the adder 40 and the decoder 42 a respective word line is accessed in a respective of said TLB sub-blocks. Each of said blocks is connected to the input lines of a multiplexor 50.

In parallel to said sequence of steps bits 50 . . . 63 of basis, index and displacement are added in a second, separate adder 46. Bits 50 and 51 reflect the potential different carry values of 0, 1 or 2. Thus, the correct carry value is determined by said addition. It is decoded in decoder 48 and is fed to the select inputs of said multiplexer 50 in order to select the right TLB entry.

With reference to FIG. 5 a table indicates the correct result selected by the multiplexor for varying values of the 7-bit adder sum, see the left most column for said sum and in the right portion of the table the results depending of the particular carry. For example, when the sum is 3, the correct result is 4 for a carry of 1.

With reference to FIGS. 6 to 9 some examples of some results with the corresponding selected entries are given. Columns denote individual blocks and rows denote individual entries of a respective block.

In the case of FIG. 6 in which the result is 0 the entries 0, 1 and 2 in the blocks 1, 2 and 3 have to be selected.

In the case of FIG. 7 the result is 1 and the entries 1, 2 and 3 in the blocks 2, 3 and 4 have to be selected.

If the result is 2 the entries 2, 3 and 4 in the blocks 3, 4 and 1 have to be selected, what is shown in FIG. 8.

If the result is 126—see FIG. 9—the entries 126 in block 3, 127 in block 4 and 0 in block 1 have to be selected.

During the 7 bit addition, the decoding and the TLB access there is enough time to make an exact addition of the bits B50 to B63 of the basis, the bits X50 to X63 of the index and the bits D52 to D63 of the displacement with said 14 bit wide 3-port adder 46.

The advantage of this proceeding reveals from the fact that no slow 19 bit wide 3-port adder is needed in the time critical path before accessing the TLB. In the critical path only a faster 7-bit wide 2 port adder is used.

With reference now to FIG. 10 a special advantageous feature of the present invention will be described. This is the fact that in the configuration of 3 potential carry values and 4 TLB sub-blocks only two simple word line decoders are necessary for an access of the four sub-blocks.

The TLB is divided in this preferred embodiment into four blocks, each containing 32 lines as it is depicted in FIG. 4.

According to the present invention each block needs one word line decoder, which leads to four word line decoders. In this preferred embodiment the exact address can be the calculated one (carry=0), the calculated one +1 (carry=1) or the calculated one +2 (carry=2).

By having three possibilities and dividing the TLB in four parts it is possible to reduce the number of word line decoders to two, one for blocks 1 and 2 and one for blocks 3 and 4. For example, if the calculated address is 0 or 1—see the upper two rows of the table depicted in FIG. 10 the word line decoder selects line 0 in block 1 and block 2.

If the inexact address is 2, 3, 4 or 5—see the next four rows- the word line decoder selects line 1 in block 1 and block 2. In block 3 and 4 the selected line is line. 0 for an inexact address of 0, 1, 2 or 3, for the addresses 4, 5, 6 and 7 the word line 1 in block 3 and 4 is selected and so on. By this the possible three entries are always in the selected lines.

The line numbers for block 3, 4 are the five higher order bits of the 7 bit inexact address, what is shown in the table. The line numbers for block 1, 2 are the five higher order bits of the 7 bit inexact address plus the next lower order bit, bit number 50, if the inexact address consists of bits 45 to 51 . That means that the word line decoder for block 1, 2 is a 6 bit decoder, and the word line decoder for block 3, 4 is only a 5-bit decoder.

The overall access time in this case is the sum of the time needed by the 7 bit wide 2-port adder 40, the address decoder 42, the TLB 44 access and the multiplexer 50. Thus, less time is needed by using a smaller adder 40 and by reading smaller arrays 44, i.e., the sub-blocks of it. The additional time needed by the multiplexor 50 is much less than the time saved compared to prior art with a very 'late' TLB access.

Advantageously, said TLB and said decoder units are implemented in a hardware macro. Thus, the performance of TLB and said decoders is further optimized.

As an additional advantageous feature of the present invention the above mentioned 2-port adder can easily be integrated in said word line decoder as reveals from U.S. Pat. No. 5,754,819. With that tight integration the function of said 2-port adder causes nearly no extra time losses.

The inventional concept is applicable to n-set-associative TLB arrangements, too as the associativity of a TLB is not touched by the basic processes of the invention to access the TLB with an intermediate select result as a preselectional TLB lookup access only.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

The inventional concept is applicable to access in general any memory structures having a table-like structure. It can be applied adequately for accessing e.g., a cache directory or a cache, as well.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent:

1. A method for fast accessing a table in which method the access requires an addition of a plurality of n bit sequences, n being greater than 1, the method being by comprising the steps of:

(a) performing a first block of steps comprising the steps of
   selecting a common middle level bit range of at least m of said n bit sequences to be added, where m<n, said bit ranges not including a respective adjacent lower level bit range comprising at least the lowest level bit of each of said bit sequences,
   adding said m middle level bit ranges to yield an intermediate result, said result delimiting a selection derivable from an addition comprising said n respective lower level bit sequences, and
   preselecting areas of said table to be accessed according to said intermediate result; and (b) in parallel to the first block of steps performing a second block of steps comprising the steps of
   adding the respective n lower level bit ranges,
   determining a carry value resulting from said addition, and
   selecting the final area of said table from said preselection under consideration of said carry result.

2. The method according to claim 1 in which said table is a translation lookaside buffer and said n bit sequences to be added are virtual addresses in a computer system or at least parts of them.

3. The method according to claim 2 in which said table is processed separately in p parts, p being greater than or equal to n, and being a power of 2.

4. The method according to claim 2 in which m is equal to n, and a displacement as a lower level virtual address part comprising at least one bit which is included in said step of adding said middle level bits.

5. The method according to claim 3 in which m is equal to n, and a displacement as a lower level virtual address part comprising at least one bit which is included in said step of adding said middle level bits.

6. A hardware circuit for implementing the method according to claim 1, the circuit comprising a memory device comprising said table to be accessed, a decoder for decoding said bit sequences, and a multiplexer, said circuit further comprising
means for selecting a common middle level bit range of at least m of said n bit sequences to be added, said bit ranges not including a respective adjacent lower level bit range comprising at least the lowest level bits of each of said bit sequences,
means for adding said m middle level bit ranges,
means for preselecting areas of said table to be accessed according to said intermediate result,
means for adding the respective n lower level bit ranges,
means for determining a carry value resulting from said addition,
means for selecting the final area of said table from said preselection under consideration of said carry result.

7. The circuit according to claim 6 in which m equals 2 and said means for adding said m middle level bit ranges is a 2-port adder.

8. The circuit according to claim 6 in which said memory device is a macro-programmed device.

9. The circuit according to claim 8 in which said 2-port adder is integrated in said macro-programmed device.

10. The circuit according to claim 6 in which said means for selecting the final area of said table from said preselection under consideration of said carry result is a multiplexor device.

* * * * *

UNITED STATES PATENT AND TRADEMARK OFFICE
CERTIFICATE OF CORRECTION

PATENT NO. : 6,681,313 B1
DATED : January 20, 2004
INVENTOR(S) : Son Dao Trong et al.

It is certified that error appears in the above-identified patent and that said Letters Patent is hereby corrected as shown below:

Title page,
Item [30], Foreign Application Priority Data,
"Jun. 23, 1999 (EP)…………….99112075" should read
-- Jun. 23, 1999 (EP)…………….99112075.9 --

Column 6,
Line 47, "m<n" should read -- $m \leq n$ --

Signed and Sealed this

Fourteenth Day of June, 2005

JON W. DUDAS
*Director of the United States Patent and Trademark Office*